US012623971B2

(12) United States Patent
Schwanke et al.

(10) Patent No.: US 12,623,971 B2
(45) Date of Patent: May 12, 2026

(54) AQUEOUS SUSPENSION CONTAINING METAL CARBIDE PARTICLES

(71) Applicant: FRAUNHOFER-GESELLSCHAFT ZUR FÖRDERUNG DER ANGEWANDTEN FORSCHUNG E. V., Munich (DE)

(72) Inventors: Stanislaus Schwanke, Nuremberg (DE); Stephan Müller, Weisendorf (DE); Elke Meissner, Eckental (DE); Boris Epelbaum, Aurachtal (DE); Christian Reimann, Münchaurach (DE); Jochen Friedrich, Eckental (DE); Lucas Becker, Parkstetten (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 1051 days.

(21) Appl. No.: 16/967,004

(22) PCT Filed: Jan. 30, 2019

(86) PCT No.: PCT/EP2019/052235
§ 371 (c)(1),
(2) Date: Aug. 3, 2020

(87) PCT Pub. No.: WO2019/154690
PCT Pub. Date: Aug. 15, 2019

(65) Prior Publication Data
US 2021/0032169 A1      Feb. 4, 2021

(30) Foreign Application Priority Data
Feb. 6, 2018    (DE) ..................... 10 2018 201 771.9

(51) Int. Cl.
| | | |
|---|---|---|
| *C04B 35/56* | (2006.01) | |
| *C04B 35/622* | (2006.01) | |

(Continued)

(52) U.S. Cl.
CPC ................... *C04B 35/5607* (2013.01); *C04B 35/62222* (2013.01); *C04B 35/6264* (2013.01);
(Continued)

(58) Field of Classification Search
None
See application file for complete search history.

(56) References Cited

U.S. PATENT DOCUMENTS

| | | | |
|---|---|---|---|
| 6,110,266 A | 8/2000 | Gonzalez-Blanco et al. | |
| 2006/0040064 A1* | 2/2006 | Dombsky ................ | H05H 6/00 427/372.2 |

(Continued)

FOREIGN PATENT DOCUMENTS

| | | |
|---|---|---|
| CN | 106699228 A | 5/2017 |
| CN | 107500781 A | 12/2017 |

(Continued)

OTHER PUBLICATIONS

China National Intellectual Property Administration, First Office Action in Chinese Patent Application No. 201980011620.6 (Jan. 14, 2022).

(Continued)

*Primary Examiner* — Michael P. Rodriguez
(74) *Attorney, Agent, or Firm* — LEYDIG, VOIT & MAYER, LTD.

(57) ABSTRACT

The present invention relates to aqueous suspensions containing 30 to 95 wt.-% metal carbide particles and a dispersant, and to a process for coating substrates using said aqueous suspensions. The invention also relates to the (Continued)

coated substrates that can be produced by the process according to the invention and to the uses thereof.

19 Claims, 1 Drawing Sheet

(51) Int. Cl.

| | |
|---|---|
| *C04B 35/626* | (2006.01) |
| *C04B 35/63* | (2006.01) |
| *C04B 35/632* | (2006.01) |
| *C04B 35/634* | (2006.01) |

(52) U.S. Cl.
CPC ...... *C04B 35/6303* (2013.01); *C04B 35/6316* (2013.01); *C04B 35/632* (2013.01); *C04B 35/63424* (2013.01); *C04B 2235/3839* (2013.01); *C04B 2235/5436* (2013.01); *C04B 2235/5445* (2013.01); *C04B 2235/5454* (2013.01); *C04B 2235/608* (2013.01); *C04B 2235/6567* (2013.01)

(56) References Cited

U.S. PATENT DOCUMENTS

| | | | |
|---|---|---|---|
| 2006/0110626 A1* | 5/2006 | Ziani | C23C 14/14 |
| | | | 204/298.13 |
| 2007/0199477 A1 | 8/2007 | Hill et al. | |
| 2009/0295048 A1 | 12/2009 | Matsumoto et al. | |
| 2012/0282469 A1 | 11/2012 | Nahas | |
| 2013/0061800 A1 | 3/2013 | Nakamura et al. | |
| 2015/0152012 A1 | 6/2015 | Rossiquet et al. | |

FOREIGN PATENT DOCUMENTS

| | | |
|---|---|---|
| DE | 197 49 082 A1 | 5/1999 |
| DE | 102005040157 A1 | 3/2007 |
| WO | WO 2017/130134 A1 | 8/2017 |

OTHER PUBLICATIONS

"Before Using," Vanderbilt Minerals Technical Data Sheet—DARVAN® Dispersing Agents (2016).

China National Intellectual Property Administration, Decision on Rejection in Chinese Patent Application No. 201980011620.6 (Dec. 30, 2022).

German Patent Office, Office Action in German Patent Application No. 10 2018 201 771.9 (Feb. 23, 2021).

Nakamura et al., "TaC-coated graphite prepared via a wet ceramic process: Application to CVD susceptors for epitaxial growth of wide-bandgap semiconductors," *Journal of Crystal Growth* 478: 163-173 (2017).

Nakamura et al., "Tantalum carbide coating via wet powder process: From slurry design to practical process tests," *Journal of the European Ceramic Society* 37: 1175-1185 (2017).

German Patent Office, Office Action in German Patent Application No. 10 2018 201 771.9 (Oct. 8, 2018).

European Patent Office, International Search Report in International Application No. PCT/EP2019/052235 (Sep. 23, 2019).

European Patent Office, Written Opinion in International Application No. PCT/EP2019/052235 (Sep. 23, 2019).

International Bureau of WIPO, International Preliminary Report on Patentability in International Application No. PCT/EP2019/052235 (Aug. 11, 2020).

Canadian Intellectual Property Office, Office Action in Canadian Patent Application No. 3,093,224 (May 16, 2025).

\* cited by examiner

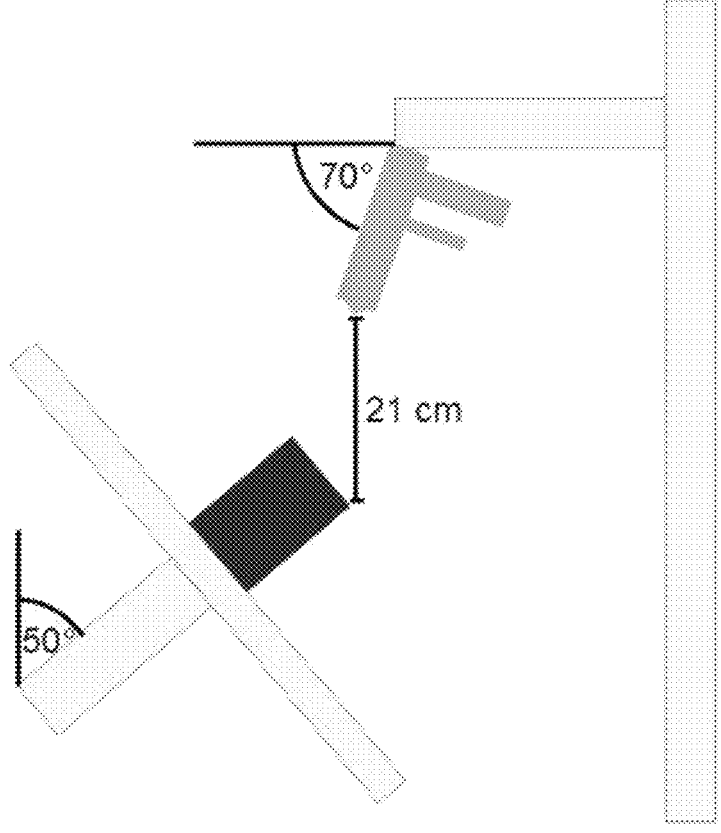

AQUEOUS SUSPENSION CONTAINING METAL CARBIDE PARTICLES

CROSS-REFERENCE TO RELATED APPLICATIONS

This patent application is the U.S. national phase of International Application No. PCT/EP2019/052235, filed on Jan. 30, 2019, which claims the benefit of German Patent Application No. 10 2018 201 771.9, filed Feb. 6, 2018, the disclosures of which are incorporated herein by reference in their entireties for all purposes.

The present invention relates to aqueous suspensions comprising metal carbide particles and dispersants and to a process for coating substrates using these aqueous suspensions. The invention further relates to the coated substrates producible by the process according to the invention and to the uses thereof.

High-melting metal carbides, for example carbides of titanium, zirconium, hafnium, niobium, tantalum, chromium, molybdenum, tungsten, and silicon, are characterized by their high mechanical, chemical, and thermal stability. Carbidic materials are consequently widely used in the form of solid ceramic bodies or in the form of coatings. For example, carbidic materials are used in the production of materials at high temperatures and/or in chemically aggressive environments, in the production of cutting tools or else engine nozzles, and in crystal growing.

However, their mechanical hardness makes metal carbides difficult to process. This means that solid shaped bodies having relatively complex geometries can be produced from these materials only with difficulty and at considerable cost. For this reason, structural components are mostly only coated with metal carbides.

Commonly used coating processes are the CVD (chemical vapor deposition) and PVD (physical vapor deposition) processes. However, the coatings obtainable by these processes are generally only a maximum of a few micrometers thick, which, because of poor long-term stability, is not sufficient for certain applications, for example in the production of silicon carbide or aluminum nitride crystals.

The prior art also includes descriptions of metal carbide coatings produced via a wet-ceramic process in which an organic suspension of metal carbide particles is applied to the components to be coated by painting, spraying or dipping, followed by a sintering process.

US 2013/0061800 A1 describes a highly thermally stable element that contains a graphite substrate comprising isotropic graphite. The highly thermally stable element also includes a carbide coating that contains a carbide such as tantalum carbide. In addition, processes for producing said element are described in which the carbide particles are deposited on the substrate from a suspension. This is done using suspensions with an organic solvent as the liquid phase.

Wet-ceramic processes for coating graphite with tantalum carbide are also described by D. Nakamura, T. Kimura, T. Narita, A. Suzumura, T. Kimoto, and K. Nakshima in the Journal of Crystal Growth, vol. 478, 2017 on pages 163 to 173, and by D. Nakamura, K. Shigetoh, and A. Suzumura in the Journal of the European Ceramic Society, vol. 37, 2017 on pages 1175 to 1185. In the published processes, tantalum carbide is deposited from suspensions based on organic solvents.

The wet-ceramic processes known from the prior art allow the production of relatively thick layers in which the layer is in some cases several hundred micrometers thick. In contrast to layers produced by CVD or PVD processes, layers produced by wet-ceramic processes have an isotropic texture with a random particle orientation, which results in reduced susceptibility to cracking and enhancement of the diffusion pathway for substrate-damaging species.

Suspensions based on organic solvents do, however, have important disadvantages. In addition to ecological and health considerations arising from the toxicity of organic solvents, the use of such suspensions also entails the safety problem of highly flammable spray mists. Moreover, the organic solvents must be removed by pyrolysis. This results in the unwanted introduction of foreign matter into the coating. What is more, controlled application of the suspension is not possible with the known suspensions, particularly in the case of spray processes, since the suspension properties can fluctuate due to evaporation of the solvent during said process, which means that over time it becomes impossible to obtain homogeneous layers.

It would additionally be desirable to be able to influence the ratio of open to closed pores in a carbide coating, which is possible only to a limited degree with the known suspensions based on organic solvents. A further desirable objective is the ability to achieve a coating having a greater depth of infiltration from the substrate surface.

Based on this, the object of the present invention was to provide suspensions that are not associated with any ecological, health, and safety problems. The production from the suspensions of coatings that are very pure and do not require a pyrolysis step should also be possible. Using the provided suspensions, it should also be possible to deposit over time very homogeneous layers and to control the ratio between open and closed pores in a coating deposited from the suspension. In addition, the depth of infiltration, from the surface of a substrate to be coated, of the coating deposited from the provided suspension should be increased. Moreover, the coatings should have low permeability to gases, high thermal shock resistance, and be stable to chemically aggressive atmospheres.

The ecological, health, and safety problems that arise through the use of suspensions containing organic solvents as the liquid phase could be eliminated through the use of water as the liquid phase.

However, water has up to now, for a variety of reasons, not been considered as a liquid phase for metal carbide suspensions. Firstly, metal carbides have a very high density (tungsten carbide 15.6 g/cm$^3$, tantalum carbide 13.9 g/cm$^3$), as a result of which segregation very rapidly occurs. In order to deposit layers having high homogeneity, it is however vital that the metal carbide particles are suspended in the suspension.

Furthermore, the high solids content necessary in an aqueous suspension means that agglomeration of the metal carbide particles must be expected, which causes cracking and a reduction in the green density in coatings deposited from such suspensions. Organic solvents, on the other hand, afford the option of suppressing agglomeration—to some degree at least—via their functional groups.

The object of the present invention is to overcome the abovementioned problems that occur with water as the liquid phase.

This object is achieved by the aqueous suspensions described herein and having the technical features listed below.

Aqueous suspension comprising
at least one metal carbide particle and
at least one dispersant, wherein the proportion of the at least one metal carbide particle is in the range from 30% to 95% by weight based on the total weight of the suspension.

Advantageous embodiments of the suspension according to the invention are also described herein.

The present invention further relates, as described herein, to a process for coating substrates using the aqueous suspension of the invention, which comprises the following steps:

i) providing a substrate;

ii) providing an aqueous suspension according to the present invention;

iii) applying the suspension from step ii) to the surface of the substrate from step i); and iv) drying the applied suspension, resulting in the formation of a coating on the surface of the substrate.

Advantageous embodiments of this process are further described herein.

The present invention further relates to substrates producible by the process according to the invention, and the uses of said substrates are further described herein.

BRIEF DESCRIPTION OF THE DRAWING

The FIGURE depicts a coating arrangement of the graphite cylinder and the rotary table during the coating of the cylinder in an aspect of the invention.

DETAILED DESCRIPTION OF THE INVENTION

Definitions of Terms

In an "aqueous suspension" in the context of the present invention, water is used as the liquid phase. Up to 2% by weight, preferably up to 1% by weight, of other solvents may be present in said phase. However, it is particularly preferable that the liquid phase of the "aqueous suspension" is exclusively water.

The "average particle size" in accordance with the present invention is understood as meaning the $d_{50}$ value, i.e. the value at which 50% of the particles have a smaller particle diameter and the other 50% of the particles have a larger particle diameter. Preference is given to determining the "average particle size" directly on the suspension by laser scattering. The size of agglomerates is preferably determined directly on the suspension by laser scattering.

The "purity" of the metal carbide particles or of the coating formed from said particles is understood as meaning the chemical purity in respect of individual elemental impurities. The purity is preferably determined by GDMS (glow discharge mass spectrometry).

The "green density" of the coating is in the context of the present invention understood as meaning the density of the layer produced in respect of the theoretical density of a sintered metal carbide layer.

The carbide of the metalloid silicon is in the context of the present invention regarded as a metal carbide.

Stated Quantities

In addition to water as the liquid phase, the aqueous suspension according to the present invention also comprises at least one metal carbide particle, at least one dispersant, and optional additives. The stated quantities are in each case based on the total weight of the suspension and the total weight of the components present adds up to 100% by weight.

Aqueous Suspension

The aqueous suspension according to the present invention comprises at least one metal carbide particle and at least one dispersant, wherein the proportion of the at least one metal carbide particle is in the range from 30% to 95% by weight based on the total weight of the suspension. The proportion of metal carbide particles is preferably determined by removing the volatile constituents from the suspension, which is preferably done by heating the suspension to a temperature above the evaporation temperature of water. The proportion of metal carbide particles can be determined from the amount weighed out.

Preferred embodiments of the aqueous suspension according to the invention are indicated herein below.

In a preferred embodiment of the present invention, the at least one metal carbide particle is selected from the group consisting of carbides of titanium, zirconium, hafnium, vanadium, niobium, tantalum, chromium, molybdenum, tungsten, silicon, and mixtures thereof, with preference given to tantalum carbide.

It is preferable here that the at least one metal carbide particle has an average particle size in the range from 0.05 to 25 µm, more preferably from 0.5 to 5 µm, and particularly preferably from 1 to 2 µm.

It is further preferable that the at least one metal carbide particle has a content of individual elemental impurities of <300 ppm, preferably <10 ppm, and more preferably of less than 1 ppm. Where the metal carbide particles are not commercially available in sufficient purity, these may be purified by processes known to those skilled in the art, such as wet-chemical purification. Moreover, the purity of the coating deposited from an aqueous suspension does not necessarily correspond to the purity of the metal carbide particles used. A removal of impurities is possible via the process according to the invention described below.

It is particularly preferable that the at least one metal carbide particle has an average particle size in the range from 0.05 to 25 µm, more preferably from 0.5 to 5 µm and very particularly preferably from 1 to 2 µm and a content of individual elemental impurities of <300 ppm, preferably <10 ppm, and more preferably of less than 1 ppm.

A preferred metal carbide is tantalum carbide, which particularly preferably has a phase fraction of the cubic phase from 70 to 100%.

In another preferred embodiment, it may be the case that the dispersant is selected from the group consisting of polyacrylic acid, which preferably has a number-average molecular weight in the range from 3000 to 10 000 g/mol and more preferably from 4000 to 6000 g/mol, tetrabutylammonium hydroxide, and mixtures thereof.

In another preferred embodiment of the present invention, this comprises at least one additive preferably selected from the group consisting of bases, in particular sodium hydroxide solution, defoamers, in particular fatty alcohol polyalkylene glycol ethers, sintering aids, in particular cobalt or silicon, and mixtures thereof. Particularly preferred additives here are defoamers. The use of the latter suppresses bubble formation in the suspension, resulting in decreased cracking.

In a further preferred embodiment of the present invention, it may be the case that the proportion of metal carbide particles is in the range from 40% to 90% by weight and preferably from 60% to 85% by weight, based on the total weight of the suspension.

In another preferred embodiment of the present invention, it may be the case that the proportion of the dispersant is in the range from 0.05% to 5% by weight and preferably from 0.1% to 2% by weight, based on the total weight of the suspension.

In a further preferred embodiment of the present invention, the proportion of additives in the suspension is in the range from 0% to 10% by weight and preferably from 0.5% to 5% by weight, based on the total weight of the suspension.

In another preferred embodiment of the present invention, the proportion of metal carbide particles is in the range from 40% to 90% by weight and preferably from 60% to 85% by weight, the proportion of the dispersant is in the range from 0.05% to 5% by weight and preferably from 0.1% to 2% by weight, and the proportion of additives in the suspension is in the range from 0% to 10% by weight and preferably from 0.5% to 5% by weight, in each case based on the total weight of the suspension.

In a further preferred embodiment of the present invention, it may be the case that the pH of the suspension is in the range from 5 to 10 and preferably from 7 to 8. When polyacrylic acid is used as the dispersant, the pH is preferably in the range from 7 to 8.

In a further preferred embodiment, the aqueous suspension contains no other constituents besides water, metal carbide particles, dispersants, and the additives indicated above.

In a further preferred embodiment of the present invention, the aqueous suspension is completely free of organic solvents.

Process

The process according to the invention for coating a substrate comprises the following steps:

i) providing a substrate;

ii) providing the aqueous suspension of the invention iii) applying the suspension from step ii) to the surface of the substrate from step i);

iv) drying the applied suspension, resulting in the formation of a coating on the surface of the substrate.

Preferred embodiments of the process according to the invention are indicated herein below.

In a preferred embodiment of the process according to the present invention, the substrate is selected from the group consisting of graphite, materials having an adjusted coefficient of thermal expansion, preferably graphite having an adjusted coefficient of thermal expansion in the range from 6.5 to 7.5*$10^{-6}$ $K^{-1}$, and mixtures thereof.

In a further preferred embodiment of the process according to the invention, it may be the case that the process includes the following further steps:

v) pretreating the substrate provided in step i) prior to step iii), with the pretreatment effected preferably by a measure selected from the group consisting of mechanical roughening of the surface, thermal pretreatment of the surface, chemical treatment of the surface, and mixtures thereof, and subsequent cleaning, in particular by means of sonication;

vi) sintering of the coating obtained after step iv).

In order to achieve good adhesion of the coating on the substrate, it is particularly advantageous to first mechanically roughen the substrate and then create a hydrophilic surface through appropriate cleaning steps by means of sonication. Particularly in the case of a graphite substrate, care must be taken to ensure elimination of, or at least a reduction in, the number of loose particles on the surface.

In another preferred embodiment, the suspension in step iii) is applied by painting, dipping or spraying.

When applying by spraying, the substrate is preferably positioned in the centre of a rotatable turntable and fixed in place by means of special holders. The tilt angle of the turntable and the spray angle of the spray gun are additionally adjusted according to the geometry of the substrate to be coated by means of a specially designated holder. The substrate is then coated with the aqueous suspension under firmly defined spray parameters (including the atomizer air pressure, throttling of the material supply via the needle lift, and distance from the nozzle opening to the substrate surface). The speed of rotation of the turntable during the spraying process is guided by the desired layer thickness of the subsequent coating.

In a further preferred embodiment of the present invention, step iv) is carried out at a temperature in the range from 100 to 600° C., preferably from 120 to 550° C., and more preferably from 145 to 455° C., with preference given to carrying out step iv) over a period of 5 to 40 hours and more preferably of 20 to 30 hours.

In order to obtain crack-free layers, it has proven advantageous to anneal the coating obtained in step iv) over several temperature steps. The inclusion of hold phases is particularly preferable in order to prevent overly rapid drying and consequent cracking. The specific hold phases are guided by the evaporation behavior of the dispersant used. When cobalt is used as sintering aid, it is advantageous to carry out the drying process under an inert gas atmosphere.

In a preferred drying process iv), the temperature ranges and time intervals may be as follows:

(1) 140 to 160° C. for 2.5 to 3.5 hours; then
(2) 180 to 220° C. for 1.5 to 2.5 hours; then
(3) held for 2 hours at the temperature from (2); then
(4) 200 to 250° C. for 1.5 to 2.5 hours; then
(5) 310 to 350° C. for 4.5 to 5.5 hours; then
(6) 330 to 350° C. for 1.5 to 2.5 hours; then
(7) held for 2 hours at the temperature from (6); then
(8) 380 to 420° C. for 3.5 to 4.5 hours; then
(9) 430 to 470° C. for 1.5 to 2.5 hours.

In another preferred embodiment of the present invention, step vi) (=sintering) is carried out at a temperature in the range from 2000 to 2600° C., preferably from 2100 to 2500° C., and more preferably from 2200 to 2300° C. Particular preference is given to carrying out step vi) over a period of 1 to 10 hours, more preferably of 3 to 5 hours. It is further preferable to carry out step vi) at a pressure in the range from 500 to 900 torr, preferably from 600 to 800 torr, and more preferably from 680 to 720 torr.

In another preferred embodiment of the present invention, step vi) is carried out under inert gas, with the inert gas particularly preferably being selected from the group consisting of helium, argon, nitrogen, and mixtures thereof.

The addition of sintering aids such as cobalt or silicon boosts the flow behavior during the sintering process and increases the achievable coating end density.

In another preferred embodiment of the present invention, the green density of the coating prior to step v) is at least 50% and preferably at least 60%.

In a further preferred embodiment, it may be the case that the coating after step iv) or vi) has a content of individual elemental impurities of less than 300 ppm and preferably of less than 1 ppm.

In another preferred embodiment, the coating after step iv) or vi) has an open porosity of less than 5% and preferably of less than 1%. This is determined preferably by Hg porosimetry.

In another preferred embodiment of the present invention, the thickness of the coating after step iv) or vi) is in the range from 20 to 500 μm, preferably from 50 to 400 μm, and more preferably from to 100 to 300 μm.

In a further preferred embodiment, it may be the case that the pH of the aqueous suspension prior to step iii) is in the range from 5 to 10 and preferably from 7 to 8, particularly for polyacrylic acid as dispersant.

Coated Substrate

The present invention further relates to a coated substrate producible by the process according to the invention.

In another preferred embodiment, the thickness of the coating is in the range from 20 to 500 μm, preferably from 50 to 400 μm, and more preferably from 100 to 300 μm.

In a further preferred embodiment, it may be the case that the coating after step iv) or vi) has an impurity content of less than 300 ppm and preferably of less than 1 ppm.

In another preferred embodiment, the coating after step iv) or vi) has an open porosity of less than 5% and preferably of less than 1%.

Use

The coated substrates according to the invention are used as carbidic materials.

Preference is given here to uses in applications for crystal growing, in particular applications for PVT (physical vapor phase) processes, epitaxy processes, and for crucibles.

The object of the invention is elucidated in more detail with reference to the examples that follow, without intending to restrict it to the specific embodiments shown here.

Preparation of Aqueous Suspension 1

An aqueous tantalum carbide suspension was prepared using a dispersing agitator. This was done by adding the tantalum carbide powder (70% by weight, total impurity content: 300 ppm, H. C. Starck), polyacrylic acid (0.5% by weight, $M_w$ 5000 g/mol, Polyscience Europe GmbH), sintering aid (0.7% by weight of silicon, H. C. Starck), defoamer (2 drops of Contraspum, Zschimmer and Schwarz) one step at a time to distilled water (28.8% by weight). Between the addition of each individual component, the suspension was processed with a stirrer unit for up to 15 minutes at 4000 revolutions per minute to ensure that the metal carbide powder, the dispersant, and the additives used were homogeneously dispersed in the suspension. The pH of the suspension was adjusted with sodium hydroxide solution to pH 8. The proportion of tantalum carbide was 70% by weight based on the total weight of the aqueous suspension.

Preparation of Aqueous Suspension 2

An aqueous tantalum carbide suspension was prepared using a dispersing agitator. This was done by adding the tantalum carbide powder (70% by weight, total impurity content: 300 ppm, H. C. Starck), tetrabutylammonium hydroxide (0.5% by weight, Sigma Aldrich), sintering aid (0.7% by weight of silicon, H. C. Starck), defoamer (2 drops of Contraspum, Zschimmer and Schwarz) one step at a time to distilled water (28.8% by weight). Between the addition of each individual component, the suspension was processed with a stirrer unit for up to 15 minutes at 4000 revolutions per minute to ensure that the metal carbide powder, the dispersant, and the additives used were homogeneously dispersed in the suspension. The pH of the suspension was 7. The proportion of tantalum carbide was 70% by weight based on the total weight of the aqueous suspension.

Aqueous suspensions 1 and 2 were used to coat a graphite substrate.

Coating was carried out on a coating stand having a rotatable and tiltable turntable with the aid of a spray gun. The spray gun was operated with 2 bar of compressed air and was mounted on a holder that allows both the angle and the distance from the specimen to be varied. For coating the graphite substrate (the FIGURE depicts a graphite cylinder by way of example), a distance of 19 cm and a spray angle of 90° were chosen. On account of the cylindrical geometry, the interior of the graphite cylinder was coated in accordance with the assembly shown in the FIGURE. For this, the cylinder was fixed to the rotary table and tilted at an angle of 50°. The mouth of the gun was positioned at a distance of 21 cm and at a horizontal tilt angle of 70° (the FIGURE). The exterior was coated manually by making up and down movements perpendicular to the cylinder wall with simultaneous rotation of the table.

To determine the sintered density of the corresponding layers, after the actual sintering step the mass, thickness, and area of the layer thus obtained were determined, the sintered density calculated from the thickness and area the layer volume and from the volume and mass and related to the maximum theoretical density of TaC (14.3 g/cm³). The coating from suspension 1 afforded a sintered density of 54% and for the coating from suspension 2 the sintered density was 56%.

Through analyses of cross sections of the coated and sintered substrates, the layer thickness in both cases could be determined by scanning electron microscopy and incident light microscopy and was 100 μm.

The invention claimed is:

1. An aqueous suspension comprising at least one metal carbide particle selected from the group consisting of carbides of hafnium, vanadium, niobium, tantalum, chromium, molybdenum, and tungsten, and at least one dispersant, wherein the proportion of the at least one metal carbide particle present is present in the range from 60% to 95% by weight based on the total weight of the suspension, and wherein solvents other than water are present in the aqueous suspension in an amount of up to 2% by weight or no solvents other than water are present in the aqueous suspension.

2. The aqueous suspension of claim 1, wherein:
the at least one metal carbide particle has an average particle size in the range from 0.05 to 25 μm;
the at least one metal carbide particle has a content of individual elemental impurity of <300 ppm; and/or
the dispersant is selected from the group consisting of polyacrylic acid, tetrabutylammonium hydroxide, and mixtures thereof.

3. The aqueous suspension of claim 1, which comprises at least one additive selected from the group consisting of a base, a defoamer, a sintering aid, and mixtures thereof.

4. The aqueous suspension of claim 3, wherein the base is sodium hydroxide solution, the defoamer is a fatty alcohol polyalkylene glycol ether, and/or the sintering aid is cobalt, silicon, or a mixture thereof.

5. The aqueous suspension of claim 1, wherein:
the proportion of metal carbide particles is in the range from 60% to 90% by weight based on the total weight of the suspension; and/or
the proportion of the dispersant is in the range from 0.05% to 5% by weight based on the total weight of the suspension; and/or
the proportion of the at least one additive is in the range from 0% to 10% by weight based on the total weight of the suspension.

6. A process for coating a substrate comprising the following steps:
i) providing a substrate;
ii) providing an aqueous suspension comprising at least one metal carbide particle selected from the group consisting of carbides of hafnium, vanadium, niobium, tantalum, chromium, molybdenum, and tungsten, and at least one dispersant, wherein the proportion of the at least one metal carbide particle present is present in the range from 60% to 95% by weight based on the total weight of the suspension, and wherein solvents other than water are present in the aqueous suspension in an amount of up to 2% by weight or no solvents other than water are present in the aqueous suspension;

iii) applying the suspension from step ii) by spraying on to the surface of the substrate from step i); and iv) drying the applied suspension, resulting in the formation of a coating on the surface of the substrate.

7. The process of claim 6, wherein the substrate is selected from the group consisting of graphite, materials having an adjusted coefficient of thermal expansion, and mixtures thereof.

8. The process of claim 6, further comprising:

v) pretreating the substrate provided in step i) prior to step iii), with the pretreatment effected by a measure selected from the group consisting of mechanical roughening of the surface, thermal pretreatment of the surface, chemical treatment of the surface, and combinations thereof, and subsequent cleaning, in particular by means of sonication; and vi) sintering of the coating obtained after step iv).

9. The process of claim 6, wherein step iv) is carried out at a temperature in the range from 100 to 600° C.

10. The process of claim 9, comprising carrying out step iv) over a period of 5 to 40 hours.

11. The process of claim 10, wherein, in step iv), the temperature is increased in stages.

12. The process of claim 11, wherein, in step iv) the temperature is increases as follows:

(1) 140 to 160° C. for 2.5 to 3.5 hours; then
(2) 180 to 220° C. for 1.5 to 2.5 hours; then
(3) held for 2 hours at the temperature from (2); then
(4) 200 to 250° C. for 1.5 to 2.5 hours; then
(5) 310 to 350° C. for 4.5 to 5.5 hours; then
(6) 330 to 350° C. for 1.5 to 2.5 hours; then
(7) held for 2 hours at the temperature from (6); then
(8) 380 to 420° C. for 3.5 to 4.5 hours; then
(9) 430 to 470° C. for 1.5 to 2.5 hours.

13. The process of claim 8, wherein step vi) is carried out at a temperature in the range from 2000 to 2600° C. over a period of 1 to 10 hours;

step vi) is carried out at a pressure in the range from 500 to 900 torr; and/or step vi) is carried out under inert gas.

14. The process of claim 8, wherein the green density of the coating after step iv) and/or prior to step vi) is at least 50%; and/or the coating after step iv) or vi) has an impurity content of less than 300 ppm; and/or the coating after step iv) or vi) has an open porosity of less than 5%.

15. The process of claim 6, wherein the thickness of the coating after step iv) or vi) is in the range from 20 to 500 μm; and/or the pH of the aqueous suspension prior to step iii) is in the range from 5 to 10.

16. A coated substrate produced by a process for coating a substrate comprising:

i) providing a substrate;

ii) providing an aqueous suspension comprising at least one metal carbide particle and at least one dispersant, wherein the proportion of the at least one metal carbide particle is in the range from 60% to 95% by weight based on the total weight of the suspension, wherein the at least one metal carbide is selected from the group consisting of carbides of hafnium, vanadium, niobium, tantalum, chromium, molybdenum, and tungsten; and wherein solvents other than water are present in the aqueous suspension in an amount of up to 2% by weight or no solvents other than water are present in the aqueous suspension;

iii) applying by spraying on the suspension from step ii) to a surface of the substrate from step i); and iv) drying the applied suspension, resulting in the formation of a coating on the surface of the substrate.

17. The coated substrate of claim 16, wherein the thickness of the coating is in the range from 20 to 500 μm.

18. A process of growing crystals comprising utilizing the coated substrate of claim 17 as a carbidic material.

19. The process of growing crystals according to claim 18, comprising a physical vapor-phase process, an epitaxy process, or crucible formation.

* * * * *